United States Patent [19]

Jin et al.

[11] Patent Number: 5,599,851
[45] Date of Patent: Feb. 4, 1997

[54] SUPERFINE MICROELEMENTAL BIOCHEMICAL MIXTURE AND FOAMED PLASTIC PRODUCTS THEREOF

[75] Inventors: Rui Jin; Jun Liu; Qibiao Yang, all of Gongbei, China

[73] Assignee: Wonder & Bioenergy Hi-Tech International Inc., China

[21] Appl. No.: 522,620

[22] Filed: Sep. 1, 1995

[30] Foreign Application Priority Data

Dec. 26, 1994 [CN] China .................. 94 1 019015.3

[51] Int. Cl.⁶ .................. C08G 18/24; C08G 18/22
[52] U.S. Cl. .................. 521/107; 521/121; 521/122; 521/123; 521/126; 521/127; 521/128; 521/131
[58] Field of Search .................. 521/107, 122, 521/123, 126, 127, 121, 128, 131

[56] References Cited

U.S. PATENT DOCUMENTS

| | | | |
|---|---|---|---|
| 4,616,043 | 10/1986 | Smith | 521/107 |
| 4,743,624 | 5/1988 | Blourrot | 521/107 |
| 4,748,192 | 5/1988 | Smith | 521/107 |

*Primary Examiner*—Morton Foelak
*Attorney, Agent, or Firm*—Silverman, Cass & Singer, Ltd.

[57] ABSTRACT

This invention relates to a kind of superfine microelemental biochemical mixture and its foamed plastic products. The mixture contains titanium oxide, zirconia, silica, yttrium oxide, cerium oxide, tin dioxide, silver phosphate and other microelements, and has certain impact on human body's micro-circulation. The plastic products comprise the mixture according to the invention and base materials which conventionally are used in preparation for foamed plastics.

4 Claims, No Drawings

SUPERFINE MICROELEMENTAL BIOCHEMICAL MIXTURE AND FOAMED PLASTIC PRODUCTS THEREOF

BACKGROUND OF THE INVENTION

This invention relates to a kind of superfine microelemental biochemical mixture of several microelements and metal oxides and the foamed plastic products containing the mixture, which can improve the microcirculation of human body.

CN90102189.X disclosed a kind of infra-red microenergy radioactive powder, synthetic fiber containing it and fiber products thereof. The main ingredients of the said powder were aluminum oxide and Ti, and Pt or Pd was used as its additives. This powder may give off infra-red microenergy of a wide spectrum, it may keep warm by means of its fiber products. We have made research on rare earth elements and have made a breakthrough in this field, for example, in the granted CN 93 111620.1 we have disclosed a kind of superfine microelemental biochemical mixture, which mainly comprised zirconia and silica, with the special structure and property of rareearth elements mixed, the fiber products can improve micro-circulation of human body, produce biological field effect on human body and help with man's health.

Accordingly, upon the basis of the known art we have optimized ingredients of the mixture in order to produce best effect on human body, that is an objective of this invention.

SUMMARY OF THE INVENTION

This invention relates to a kind of superfine microelemental biochemical mixture, which contains titanium oxide, zirconia, silica, yttrium oxide, cerium oxide, fin dioxide, silver phosphate and other microelements, and its foamed plastic products. The plastic products comprise the mixture according to the invention and base materials which conventionally are used in preparation for foamed plastics.

DETAILED DESCRIPTION

This invention provides a superfine microelemental biochemical mixture, wherein oxidized metals are titanium oxide, zirconia, silica, yttrium oxide, cerium oxide, tin dioxide, zinc oxide, silver phosphate and other elements, the proportions are (by weight):

titanium oxide 70–80%, zirconia 10–20%, silica 5–10%, yttrium oxide 0.2–2%, cerium oxide 0.1–2%, tin dioxide 1–5%, zinc oxide 0.01–0.2%, silver phosphate 0.01–0.2% and other elements in suitable amount.

Other elements may be one or more of the followings: Ge, Pd, Pt, Ga, Fe, Ca, B, Se, Mo, and usually be used in micro amount.

The mixture of present invention can be produced according to the method in the known art, i.e. to mix uniformly given amounts of oxidized metals and silver phosphate with micro amounts of the said metals at first, calcine them at 500°–1600 °C. for 6–16 hours, and then by using the conventional forming powder technology the calcined product is made into superfine microelemental biochemical mixture with its granularity $\leq 0.5$ μm.

This invention also provides foamed plastic products, which contain 5–30% (by weight) the superfine microelemental biochemical mixture of this invention, and suitable amount of anti-aging agent and dispersing agent. These products include articles for bed, sofa, cushions, insoles and other plastics contacting human body directly or indirectly.

Other ingredients of the foamed plastic products according to this invention may be the raw materials usually used in producing foamed plastics. preferable products according to the invention are those containing polyaminoesters, e.g. the product comprising a superfine microelemental biochemical mixture according to the invention, polyether, tolyl bi-isocyanate, silicon oil foam stabilizer, organic tin compound, N-ethyl morpholine, fluoro trichloromethane, water, anti-aging agent and dispersing agent.

The anti-aging agent and dispersing agent said above are those conventionally used in the plastics field. The anti-aging agent is usually phenols, and dispersing agent is preferably sodium dodecyl sulfonate or OP-10. The organic tin compound is used as catalyzer, fin tributyl chloride and tm(II) caprylate is preferable. The polyethers of different molecular weight can be selected according to various uses, preferable those of molecular-weight average 3000.

According to an application objective, the skilled in the art may determine particular base materials and amount of the additives used.

The foamed plastic products containing the mixture of this invention are produced according to the process similar to those of the known art.

It has been proved that human body's micro-circulation obstruction is responsible for many of its diseases, including headache, chest pain, stomachache, lumbago and joint pain. All these diseases are related to micro-circulation obstruction in different extent. Administrating this superfine microelemental biochemical mixture of the invention to the mice, we have found with naked eyes that the number of capillary vessel of opened nail fold, the velocity and volume of blood stream increased. The increase of blood volume of microcirculation can stimulate metabolism, accelerate the decomposition of metabolism products by any grounds, and therefore it may cure various diseases relating to micro-circulation, e.g. to allay intimation or ease pain. Besides, it can help people recover from fatigue, and promote immune potential. Physiological tests have proved that foamed plastic products made according to the invention display no irritating and allergic effect on human skin. When affecting human body, they can auto-mediate effectively and assimilate the energy surrounding the molecule of life cell, or the energy radiated by biological body itself. This mixture exerts a counteraction on human-body enduringly through the effect of "biological field", and have a macroscopic mediation effect on the exchange of energy and life information. It can also greatly stimulate the potential of human body to make them adapt to the environment. Therefore, it can mediate human body, improve micro-circulation and help with man's health recovery.

The following examples will illustrate this invention.

EXAMPLE 1

A superfine microelemental biochemical mixture and process for preparation thereof Ingredients (by weight): titanium oxide 75%, zirconia 15%, silica 5%, yttrium oxide 1%, cerium oxide 0.5%, tin dioxide 2%, zinc oxide 0.15%, silver phosphate 0.1%, and Ge, Pd, Pt, Ag, Fe, Ca, B, Se, Mo in micro amount.

The above ingredients were mixed uniformly and calcined at 1000° for 12 hours. The calcined product was then ground on ball mill for 6 hours and comminuted through the gas comminution equipment to obtain the superfine microelemental biochemical mixture, with its granularity $\leq 0.5$ μm.

EXAMPLE 2

A superfine microelemental biochemical mixture and process for preparation thereof Ingredients (by weight): titanium oxide 80%, zirconia 10%, silica 8%, yttrium oxide 2%, cerium oxide 0.8%, fin dioxide 3%, zinc oxide 0.1%, silver phosphate 0.15%, and Ge, Pd, Pt, Ag, Fe, Ca, B, Se, Mo in micro amount.

The above ingredients were mixed uniformly and calcined at 900° C. for 15 hours. The calcined products were then ground on ball mill for 6 hours and comminuted through the gas comminution equipment to obtain the superfine microelemental biochemical mixture of the invention, with its granularity ≦0.5 μm.

EXAMPLE 3

A foamed plastic product containing the mixture (exemplified with a foamed plastic product containing polyaminoesters )

| Ingredients | Parts (by weight) |
|---|---|
| polyether (molecular-weight average 3000) | 100 |
| tolyl bi-isocyanate | 40 |
| silicon oil foam stabilizer (L-520) | 2 |
| tin (II) caprylate | 0.5 |
| N-ethyl morpholine | 0.2 |
| water | 8 |
| fluoro trichloromethane | 6 |
| anti-aging agent | 0.2 |
| sodium dodecyl sulfonate | 0.1 |
| mixture of Example 1 | 20 |

To the polyether of the given amount were added water and silicon oil foam stabilizer in given amount, and the resulting mixture was poured into reaction still. Under nitrogen atmosphere the given amount of the superfine microelemental biochemical mixture and sodium dodecyl sulfonate were added dropwise to the above mixture while stirring. The reaction moderately stirred till well-distributed, and then N-ethyl morpholine and tin(II) caprylate in given amount were added, and the mixture continued to stir till uniform, then stirred violently, and finally tolyl bi-isocyanate, fluoro trichloromethane and anti-aging agent were added, and the resulting mixture stirred violently for 1–5 seconds. The mixture was put into the die for spontaneous foaming, allowed to ripen at room temperature and then post-treated. The foamed plastics containing polyaminoesters was obtained after 24 hr.

We claim:

1. A foamed polyurethane plastic product containing 5–30% (by weight) the superfine microelemental mixture whose proportions are (by weight): titanium oxide 70–80%, zirconia 10–20%, silica 5–10%, yttrium oxide 0.2–2%, cerium oxide 0.1–2%, tin dioxide 1–5%, zinc oxide 0.01–0.2%, silver phosphate 0.01–0.2%, and other elements in suitable amount, with the granularity of the mixture ≦0.5 μm, and anti-aging agent and dispersing agent in suitable amount.

2. A foamed polyurethane plastic product according to claim 1, wherein the base materials are the same as those constituting polyaminoester foamed plastics.

3. A foamed polyurethane plastic product according to claim 2, wherein the base materials are ployether, tolyl bi-isocyanate, silicon oil foam stabilizer, organic tin compound, N-ethyl morpholine, fluoro trichloromethane and water.

4. A foamed polyurethane plastic product according to claim 3, wherein the dispersing agent is sodium dodecyl sulfonate or OP-10.

* * * * *